United States Patent Office 2,831,012
Patented Apr. 15, 1958

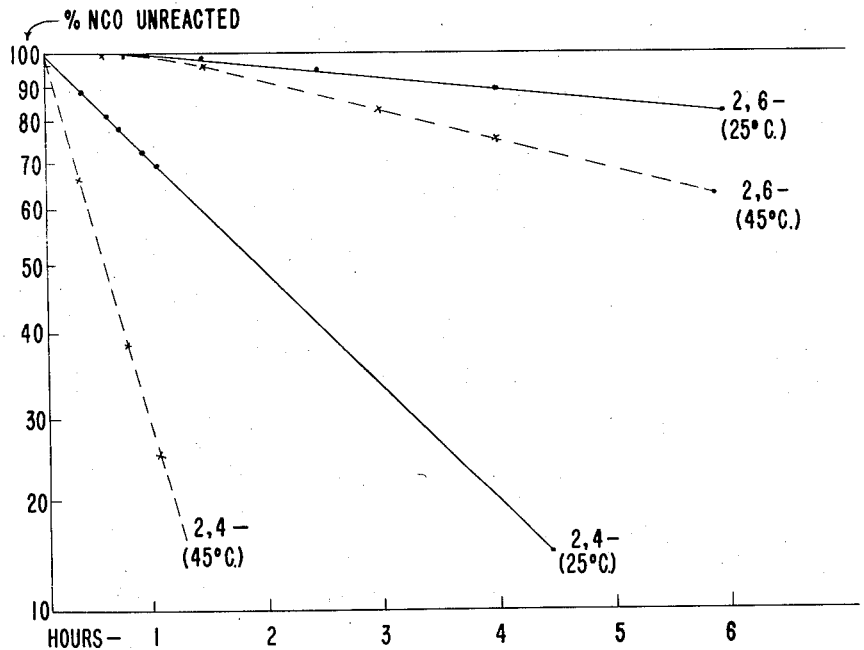

2,831,012

CHEMICAL PROCESS

Robert A. Bernard, Upper Darby, Pa., assignor to E. I. du Pont de Nemours and Company, Wilmington, Del., a corporation of Delaware Application March 29, 1957, Serial No. 649,281

9 Claims. (Cl. 260—453)

This invention is directed to a novel process for separating toluene-2,4-diisocyanate from its 2,6-isomer and for obtaining isomer mixtures rich in the toluene-2,6-diisocyanate. Toluene-2,4-diisocyanate and toluene-2,6-diisocyanate are useful in the preparation of polyurethane elastomers, resilient foams, cellular plastics, and protective coatings.

Toluenediisocyanate is prepared from toluenediamine by phosgenation and subsequent decomposition of the intermediate bis(carbamylchloride). Toluenediamine itself is made by the reduction of dinitrotoluene. The process used to nitrate toluene produces a mixture consisting primarily of 2,4-dinitrotoluene and 2,6-dinitrotoluene together with lesser amounts of other isomers. The 2,4-dinitrotoluene may be partly removed by a very slow crystallization process which leaves a eutectic oil consisting of approximately equal amounts of 2,4- and 2,6-dinitrotoluene.

It is an object of the present invention to provide a new process whereby substantially pure toluene-2,4-diisocyanate may be rapidly and conveniently separated from its 2,6-isomer.

It is a further object of this invention to provide a process for obtaining toluenediisocyanate mixtures which contain the 2,6:2,4-isomers in a molar ratio greater than 1:1.

Another object of this invention is to provide mixtures of toluenediisocyanate isomers from which toluene-2,6-diisocyanate may be separated by crystallization.

More particularly, the present invention is directed to a process for removing toluene-2,4-diisocyanate and toluene-2,6-diisocyanate in a molar ratio of at least 70:30 from an isomer mixture containing the isomers in a molar ratio from 91:9 to 40:60 which process comprises treating a solution containing as much of the said mixture as 50% by weight in an inert hydrocarbon or chlorinated hydrocarbon solvent, said solvent being unreactive with isocyanates, at a temperature between about 0–70° C. with about 1–2 molar equivalents of hydrogen chloride for each mole of toluene-2,4-diisocyanate to be removed from the mixture, followed by cooling the mixture until precipitation occurs and separating the precipitate formed.

The process of the present invention separates toluene-2,4-diisocyanate from its isomer mixture with toluene-2,6-diisocyanate. The isomer mixture is dissolved in an inert solvent and the solution obtained is treated with hydrogen chloride. The carbamyl chloride of toluene-2,4-diisocyanate forms preferentially and precipitates; the precipitate is then separated from the solution and the solution remaining is then heated to drive off the hydrogen chloride. The solution may then be concentrated to yield the residual isomer mixture itself. The precipitate is heated in an inert solvent to regenerate the toluenediisocyanate.

The process of the present invention may be used to treat mixtures of toluene-2,4-diisocyanate and toluene-2,6-diisocyanate containing the isomers in molar ratios ranging from about 91:9 to 40:60. The preferred ratio is about 80:20. The process is carried out in a dry reactor protected from atmospheric moisture. The isomer mixture is dissolved with agitation in an inert solvent. The preferred concentration of the solution is in the neighborhood of 20% by weight but it may be as high as 50%. When the solution is more dilute, the subsequent precipitation of the carbamyl chlorides is less complete. When the solution is more concentrated, the greater mass of precipitated carbamyl chlorides is less convenient to separate from the solution.

The solvents useful in this invention must be inert toward the reactants and the carbamyl chlorides produced; the solvents must be free from groups reactive with isocyanates. In particular, the solvent molecules must not contain active hydrogen atoms as determined by the Zerewitinoff procedure [J. Am. Chem. Soc. 49, 3181 (1927)]. Furthermore, the solvents should be free from contaminants which are reactive with isocyanates, such as water. Suitable solvents should be able to dissolve a toluenediisocyanate isomer mixture readily up to a concentration of at least 50% by weight over the temperature range 0–70° C. Furthermore, at some temperature between 0–70° C. the solvent should be unable to hold the carbamyl chlorides in solution. It is preferred that the carbamyl chloride precipitation occur at a temperature slightly below the reaction temperature.

Chlorinated aromatic hydrocarbons such as o-dichlorobenzene, chlorobenzene, alpha-chloronaphthalene, and 1,3-dichlorobenzene are suitable. Chlorinated aliphatic hydrocarbons such as carbon tetrachloride, chloroform, 1,4-dichlorobutane, 1,1-dichloroethane, 1,2-dichloroethane, 1-chlorobutane, and chlorocyclohexane are also useful. Aromatic hydrocarbons such as benzene, o-xylene, m-xylene, toluene, and mesitylene may be employed. Aliphatic hydrocarbons such as ligroin (petroleum naphtha, B. P. 90–120° C.), cyclohexane, 2,2,4-trimethylpentane, dodecane and n-decane may be utilized. o-Dichlorobenzene is the preferred solvent. Mixtures of solvents may be used provided they are completely miscible with each other.

The solution of the toluenediisocyanate isomer mixture is treated while agitated by addition of dry hydrogen chloride. This reactant may be injected as a liquid or it may be introduced as a gaseous stream. The latter method is preferable. The gas should be passed through a drying train containing a desiccant, such as anhydrous calcium sulfate, before it is allowed to enter the reaction chamber. It may be introduced constantly or intermittently. About 1–2 moles of hydrogen chloride is used for each mole of toluene-2,4-diisocyanate which is to be removed from the isomer mixture.

When hydrogen chloride is introduced into a solution of the diisocyanate isomer mixture, the isocyanate groups present may, in part, be converted to the carbamyl chloride form $$-N=C=O + HCl \longrightarrow -NH-\overset{\overset{O}{\|}}{C}-Cl$$

It has been found that the 2,4-isomer reacts more rapidly than the 2,6-isomer. The difference is pronounced at 25° C. and greater still at 45° C. In the time required for reaction of 5% of the 2,6-isomer, the 2,4-isomer has reacted to the extent of 55% at 25° C. and 85% at 45° C.

The reaction may be carried out at any temperature between about 0° and 70° C. Near 0° C. the rate of reaction is rather slow. Above 70° C. the equilibrium dissociation of the carbamyl chlorides to give the free isocyanate and hydrogen chloride becomes appreciable; in order to shift the equilibrium and achieve a higher conversion, the reaction may have to be run at superatmospheric pressure. It is preferable to operate the process at about 40–50° C.

In the attached drawing is set forth a graph which depicts the results achieved on reacting toluene diisocyanate isomers with HCl in ortho-dichlorobenzene. This graph figure plots the 2,4- and 2,6-diisocyanate results obtained at 25° C. and 45° C. reaction temperature. Similar results are obtained when a mixture containing the toluene diisocyanate isomers in a 1:1 molar ratio is treated by the procedure of the present invention.

If the solvent or mixture of solvents has a boiling point below 70° C., the limiting temperature will be the reflux temperature unless pressurized equipment is used. o-Dichlorobenzene, the preferred solvent, boils at 180° C. at atmospheric pressure.

It is preferred that the process be operated at atmospheric pressure. However, it may be carried out at superatmospheric pressure. Example 11 illustrates the case where the hydrogen chloride is introduced into a jacketed-reactor bottle which is maintained at 2 atmospheres pressure.

When an isomer mixture very rich in the 2,4-isomer is treated with dry gaseous hydrogen chloride in o-dichlorobenzene, the carbamyl chloride which precipitates is substantially that of the 2,4-isomer and this situation continues until the residual solution contains the isomers in approximately equal molar ratios. Thereafter co-precipitation of the 2,6-isomer begins to be more significant. Table I below provides a measure of the toluene-2,4-diisocyanate conversion as a function of the total toluenediisocyanate conversion for a mixture initially containing 80% toluene-2,4-diisocyanate. The observed 2,4-isomer content of the unreacted toluenediisocyanate mixture is compared with the values which would be theoretically observed if all the precipitated carbamyl chloride were that of the 2,4-isomer. Above 60% conversion (corresponding to the existence of an unreacted isomer mixture containing about 50% toluene-2,6-diisocyanate) the positive deviation of the observed values suggests that co-precipitation of the 2,6-isomer is occurring.

TABLE I.—REACTION OF A TDI ISOMER MIXTURE WITH HCl IN O-DICHLOROBENZENE AT 45° C

| Percent TDI* Reacted | Percent 2,4-Isomer in Unreacted Isomer Mixture | |
|---|---|---|
| | Theoretical | Observed |
| 0 | 80.0 | 80.0 |
| 13 | 77 | 74 |
| 20 | 75 | 75 |
| 30 | 71 | 71 |
| 34 | 70 | 70 |
| 40 | 67 | 67 |
| 45 | 64 | 64 |
| 50 | 60 | 61 |
| 55 | 56 | 57 |
| 60 | 50 | 52 |
| 63 | 46 | 53 |
| 65 | 43 | 52 |
| 68 | 38 | 45 |
| 70 | 33 | 38 |
| 72 | 28 | 35 |

Treatment of toluenediisocyanate * (TDI) isomer mixtures rich in the 2,6-isomer (containing about 55% or more) in o-dichlorobenzene at 45° C. with an amount of hydrogen chloride equivalent to or greater than all the toluene-2,4-diisocyanate present in the mixture does not precipitate all of that isomer. The composition of the residual isomer mixture reaches a limiting value of about 20% 2,4- and 80% 2,6-toluenediisocyanate. The following Table II is illustrative of the results obtained.

TABLE II

| Isomer Composition of Initial Mixture | | Moles 2,4-TDI at the Start | Moles HCl Introduced | Isomer Composition of the Mixture Left in the Filtrate | |
|---|---|---|---|---|---|
| Percent 2,4- | Percent 2,6- | | | Percent 2,4- | Percent 2,6- |
| 30.1 | 69.9 | 0.0226 | 0.022 | 22.7 | 77.3 |
| 32.5 | 67.5 | 0.0130 | 0.022 | 26.2 | 73.8 |
| 43.1 | 56.9 | 0.0448 | 0.049 | 23.3 | 76.7 |
| 43.3 | 56.1 | 0.0346 | 0.034 | 24.3 | 75.7 |
| 45.1 | 54.9 | 0.0456 | 0.051 | 30.1 | 69.9 |

When a toluenediisocyanate mixture containing 53.5% 2,4-isomer is about 50% converted, the isomer ratio (2,4-:2,6-) in the precipitate is about 71:29. When a mixture containing 43.5% 2,4-isomer is about 39% converted, the isomer ratio in the precipitate is about 70:30.

The carbamyl chloride formed during the introduction of the hydrogen chloride should be removed as completely as possible from the residual toluenediisocyanate isomer mixture. Therefore, it is preferred that the temperature of the reaction mixture be subsequently lowered by external cooling to about 0–5° C. The mixture is agitated for about a half hour at this temperature. Filtration is then carried out with care being taken to prevent the materials from coming in contact with atmospheric water vapor. It is advisable to blanket the filter bed with dry nitrogen. The cake of carbamyl chloride obtained is slurried with cold solvent which is then removed and combined with the initial filtrate.

The filtrates contain the unreacted toluenediisocyanate and hydrogen chloride. The solution is degassed, in general, by applying sufficient heat and vacuum to cause the solvent to come to reflux which is then maintained for about a half hour. The solution obtained may be analyzed chemically for NCO content and by infrared for the 2,4-:2,6-isomer ratio. The percent toluenediisocyanate unreacted is calculated from the percent NCO analysis and the amount of toluenediisocyanate obtained by concentration of an aliquot sample of the solution. The percent of each isomer unreacted is calculated from the percent unreacted toluenediisocyanate and the isomer ratio of the unreacted material. The isomer mixture of unreacted toluenediisocyanate may be obtained by distilling off the solvent. The precipitated carbamyl chloride mixture obtained is converted back to the diisocyanate by heating it and removing the hydrogen chloride liberated through the equilibrium dissociation

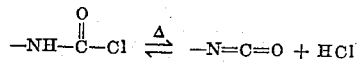

It is recommended that the decomposition be carried out in the presence of a suitable inert liquid medium; it need not be a solvent for the carbamyl chloride or the diisocyanate. If the carbamyl chloride is heated in the absence of a liquid medium, the decomposition may occur in an irregular and even hazardous manner. This process may be carried out by adding the carbamyl chloride to toluene-2,4-diisocyanate, and slowly raising the temperature of the slurry to about 85–100° C., under sufficient vacuum to cause reflux. Atmospheric moisture should always be excluded during these operations. The mixture may then be fractionally distilled if residual solvent was not completely removed from the filter cake of carbamyl chloride.

The regeneration may also be carried out in refluxing solvents which are unreactive with carbamyl chlorides, hydrogen chloride, and isocyanates and which boil (at atmospheric pressure) above 85–100°. Removal of the hydrogen chloride may also be accomplished by heating the solution at about 85–100° C. while sweeping with an inert gas such as dry nitrogen. Toluene, m-xylene, o-xylene, p-xylene, o-dichlorobenzene, m-dichlorobenzene, 2,2,4-trimethylpentane, n-decane, petroleum naphtha (B. P. 90–120° C.), 1,4-dioxane, nitrobenzene, and diethyl phthalate are examples of suitable solvents. Mixtures such as the isomeric xylenes may also be used. o-Dichlorobenzene is preferred.

The regeneration reaction is stopped when the hydrolyzable content of the mixture has decreased to the desired value.

The reaction vessels suitable for carrying out the process of this invention must be able to withstand the corrosive action of hydrogen chloride. Glass or enamel-lined or stainless steel equipment is recommended. Provision for cooling should be made to remove the heat evolved during the introduction of the hydrogen chloride into the solution of the toluenediisocyanate isomer mixture. If the reaction is carried out at superatmospheric pressure, appropriate autoclaves or bombs must be employed.

The toluenediisocyanate isomer mixtures obtained which contain about 70% or more of the 2,6-isomer may advantageously be used to obtain the pure toluene-2,6-diisocyanate. Toluene-2,4-diisocyanate and toluene-2,6-diisocyanate form a eutectic mixture at about 1° C. which contains approximately equal amounts of the isomers. An isomer mixture very rich in toluene-2,6-diisocyanate is slowly cooled and the crystals of toluene-2,6-diisocyanate which form are collected until the eutectic composition is reached.

Preferential crystallization from solution may be used to obtain the 2,6-isomer from toluenediisocyanate isomer mixtures where it is the major component. For example, a 35% solution (by weight) of a toluenediisocyanate isomer mixture (ratio of 2,4-:2,6-isomer=26.3:73.7) in ethyl acetate can be cooled at −40° C. to deposit 23% of the total diisocyanate originally present. The crystals collected have a 95% 2,6-isomer content.

*Examples*

The identification of the compound formed by the reaction between toluene-2,4-diisocyanate and anhydrous HCl at room temperature and atmospheric pressure is made as follows:

100 parts of toluene-2,4-diisocyanate and 260 parts of anhydrous toluene are treated with a stream of dry hydrogen chloride at room temperature and atmospheric pressure over a period of about 1 hour. Solid product is slow to form at first, but a large amount deposits by the end of the hour. The precipitate is filtered off, washed with petroleum ether, twice slurried and filtered using petroleum ether, dissolved in acetone, reprecipitated by adding petroleum ether and air dried. The product is white, insoluble in water but very soluble in acetone and methanol. It is analyzed for hydrolyzable chlorine by a slight modification of the Volhard procedure. (Anal.: Calc'd for $C_9H_7O_2N_2Cl$: hydrolyzable Cl, 4.74 m. eq./g.; found: hydrolyzable Cl, 4.65 m. eq./g.) This result, along with the known greater reactivity of the 4-NCO group in toluene-2,4-diisocyanate, indicates that the product is probably the monocarbamyl chloride.

*Example 1.—Treatment of a 50:50 mixture in o-dichlorobenzene at 3° and 25° C.*

(A) The experiment is carried out in a 4-neck flask equipped with a stirrer, thermometer, Dry-Ice condenser, and a bubbler for admitting hydrogen chloride which has been dried by passage through a tower packed with anhydrous calcium sulfate.

120 parts (0.69 mole) of a toluenediisocyanate mixture (ratio of 2,4:2,6 isomers=50:50) is dissolved with stirring in 260 parts of o-dichlorobenzene. The solution obtained is cooled to 3° C. and treated for 2 hours at 3° C. by introduction of a stream of gaseous hydrogen chloride. The mass is then stirred at 0–3° C. for about 1 hour. The precipitated carbamyl chloride is filtered off and washed with cold solvent. The combined filtrates are distilled. Analysis shows that 46% of the toluenediisocyanate initially present has been converted to the carbamyl chloride leaving an isomer mixture having a 73% toluene-2,6-diisocyanate content.

(B) The procedure of part A is carried out except that the reaction temperature is raised to 25° C. and the hydrogen chloride is only introduced for a half hour. A 40% conversion occurs leaving an isomer mixture having a 62% toluene-2,6-diisocyanate content.

(C) The procedure of part A is carried out except that the reaction temperature is raised to 70° C. and the hydrogen chloride is introduced for a half hour. A 32% conversion occurs leaving an isomer mixture having a 68% toluene-2,6-diisocyanate content.

*Example 2.—Treatment of an 80:20 mixture in o-dichlorobenzene at 45° C.*

867 parts (4.98 moles) of a toluenediisocyanate isomer mixture (ratio of 2,4-:2,6-isomers=80:20) is dissolved with stirring in 3480 parts of anhydrous o-dichlorobenzene in a dry reaction vessel protected from atmospheric moisture. The solution obtained is heated to 45° C. Over a period of 3.5 hours 110 parts (2.740 moles) of hydrogen chloride gas is bubbled with agitation into the solution which is kept at 45° C. The charge is stirred at 45° C. for a half hour longer and subsequently cooled to 5° C. The monocarbamyl chloride which precipitates is filtered off and washed with 870 parts of o-dichlorobenzene. Conversion to the diisocyanate gives about 425 parts of toluene-2,4-diisocyanate.

The filtrate and the wash liquor are concentrated to give 430 parts (2.47 moles) of a toluenediisocyanate isomer mixture (ratio of 2,4-:2,6-isomer=54:46) in 1313 parts of o-dichlorobenzene.

*Example 3.—Treatment of a 54:46 mixture in o-dichlorobenzene at 45° C.*

A solution of 430 parts (2.47 moles) of a toluenediisocyanate isomer mixture (ratio of 2,4-:2,6-isomer= 54:46) in 1313 parts of o-dichlorobenzene. The solution is treated at 45° C. by 47 parts (1.29 moles) of anhydrous gaseous hydrogen chloride which is introduced with agitation over a 67-minute period. The resulting mixture is stirred at 45° C. for a half hour and then cooled to 5° C. The precipitated carbamyl chloride is collected, washed with 400 parts of o-dichlorobenzene, and converted to give 216 parts (1.24 moles) of the toluene-2,4-diisocyanate. The filtrate and wash liquor are combined and degassed by heating under vacuum. This solution is concentrated to give a 90% solution of a toluenediisocyanate mixture having a ratio of 2,4-:2,6-isomer ratio of 36:64 and a hydrolyzable chlorine content of 0.015%.

*Example 4.—Treatment of a 56:44 mixture in o-dichlorobenzene at 45° C.*

A solution of 469 parts (2.70 moles) of a toluenediisocyanate mixture (ratio of 2,4-:2,6-isomer=56:44) in 2345 parts of o-dichlorobenzene is treated at 45° C. in a dry reaction vessel protected from atmospheric moisture with 64 parts (1.75 moles) of gaseous hydrogen chloride over a 1.5-hour period. The charge is then stirred at 45° C. for one hour and subsequently cooled to 5° C. The monocarbamyl chloride which precipitates is filtered off, washed with 400 parts of o-dichlorobenzene. It may be converted to give about 175 parts of toluene-2,4-diisocyanate. The filtrate and wash liquor are combined and heated to reflux under vacuum. The solution of diisocyanate isomers obtained is concentrated to give 287 parts (1.65 moles) of a toluene diisocyanate mixture (ratio 2,4-:2,6 - isomer=21:79) containing 0.004% hydrolyzable chlorine.

Example 5.—Treatment of a 78:22 mixture in o-dichlorobenzene at 45° C.

14.7 parts (0.085 mole) of a toluenediisocyanate mixture (ratio of 2,4-:2,6-isomer=78.22) and 64 parts of o-dichlorobenzene are introduced into a dry reaction vessel previously swept with dry nitrogen. Agitation is begun and the solution obtained is heated to 45° C. Then 2.3 parts (0.063 mole) of hydrogen chloride gas is added to the solution at 45° C. over a 2-hour period while agitation is maintained. The mixture is stirred at 45° C. for one hour more, cooled to 0-5° C., and the precipitated carbamyl chloride is filtered off. The filter cake obtained is washed with 16 parts of dry o-dichlorobenzene. The filtrate and wash liquor are combined and heated under vacuum to drive off dissolved hydrogen chloride, convert any carbamyl chloride present to the free isocyanate, and to distill off the solvent. The ratio of 2,4-:2,6-toluenediisocyanate isomers is found to be 42:58.

Example 6.—Treatment of a 91:9 mixture in benzene at 45° C.

435 parts (2.5 moles) of a toluenediisocyanate mixture (ratio of 2,4-:2,6-isomers=91.9) is dissolved with stirring in 1740 parts of anhydrous benzene in a dry reaction vessel protected from atmospheric moisture. External heat is applied and the temperature of the solution is adjusted to 45° C. Hydrogen chloride gas is introduced with agitation while the mass is maintained at 45° C. A heavy precipitate of carbamyl chloride separates and is collected by filtration. The benzene is distilled off at atmospheric pressure to give a toluenediisocyanate mixture analyzing for a 2,4-:2,6-isomer ratio of 87:13.

Example 7.—Treatment of a 91:9 mixture in chloroform at 45° C.

445 parts (2.81 moles) of a toluenediisocyanate mixture (ratio 2,4-:2,6-isomers=91:9) is dissolved with stirring in 1740 parts of anhydrous chloroform in a dry reaction vessel protected from atmospheric moisture. External heat is applied and the temperature of the solution is adjusted to 45° C. Then 45 parts of hydrogen chloride gas is introduced over an hour period while the temperature is maintained at 45° C. Precipitation then begins to occur as more hydrogen chloride is bubbled in and the mass turns suddenly to a very thick paste. When 55 parts (1.51 moles) of hydrogen chloride have been added the mass is filtered. The filtrate is concentrated at atmospheric pressure to remove the chloroform and convert any carbamyl chloride present to the free isocyanate. 226 parts (1.30 moles) of a toluenediisocyanate mixture is obtained which contains the 2,4 and 2,6-isomers in a ratio of 83:17.

Example 8.—Treatment of a 50:50 mixture in 60–90° ligroin at 3° C. and 25° C.

(A) The experiment is carried out in a 4-neck flask equipped with a stirrer, thermometer, Dry-Ice condenser and a bubbler for hydrogen chloride gas which is first dried by passage through a tower packed with anhydrous calcium sulfate. 120 parts (0.69 mole) of a toluenediisocyanate mixture (ratio of 2,4-:2,6-isomers=50:50) is dissolved with stirring in 160 parts of (60–90° B. P.) ligroin. The mixture is cooled to 3° C. Then hydrogen chloride gas is bubbled for 1 hour through the mixture which is maintained at 3° C. After additional agitation at 0–3° C. for about 1 hour, the mixture is filtered. The precipitated carbamyl chloride is collected and washed with cold solvent. The combined filtrates are distilled. Analysis shows that 12% of the toluenediisocyanate initially present has been converted to the carbamyl chloride. The unreacted diisocyanate present in the filtrate has a 55% 2,6-isomer content.

(B) The experimental procedure is carried out as described above in A except for an increase in the reaction time to 2 hours. Analyis of the combined filtrate and wash liquor indicates a 27% conversion. The unreacted diisocyanate has a 60% 2,6-isomer content. The carbamyl chloride collected is decomposed to the diisocyanate by heating it in o-dichlorobenzene solution at 180° C. for 4 hours. The solution is fractionally distilled and the total isocyanate recovery in the whole experiment is about 95%.

(C) The procedure of part A is repeated except that the reaction is carried out at 25° C. A 21% conversion to the carbamyl chloride occurs leaving a toluenediisocyanate mixture in which the ratio of 2,4-:2,6-isomers is 43:57.

(D) The procedure of part B is repeated except that the reaction is carred out at 25° C. A 38% conversion to the carbamyl chloride occurs leaving a toluenediisocyanate mixture in which the ratio of 2,4-:2,6-isomers is 38:62.

(E) The procedure of part A is repeated except that the reaction is run at 50° C. A 35% conversion occurs leaving a toluenediisocyanate mixture in which the ratio of 2,4:2,6-isomers is 34:66.

Example 9.—Treatment of a 91:9 mixture in petroleum ether at 20–25° C.

435 parts (1.75 moles) of a toluenediisocyanate mixture (ratio of 2,4-:2,6-isomers=91:9) is dissolved with stirring in 1411 parts of petroleum ether in a dry reaction flask protected from atmospheric moisture. The temperature of the solution obtained is adjusted to about 20–25° C. Then 70 parts (1.92 moles) of dry hydrogen chloride gas is introduced over a 6.5-hour period while agitation is maintained. Carbamyl chloride precipitation begins to occur after about 50 parts (1.37 moles) of hydrogen chloride has been introduced. Finally, 365 parts of petroleum ether are added to the thick mass and the slurry obtained is filtered. The precipitate is washed with 286 parts of petroleum ether. The combined filtrates yield a toluenediisocyanate mixture containing the 2,4- and 2,6-isomers in a ratio of 78:22.

Example 10

(A) 55 parts (1.5 moles) of dry hydrogen chloride gas is bubbled through a solution of 491 parts (2.81 moles) of a toluenediisocyanate mixture (ratio of 2,4-:2,6-isomers=91:9) in 1763 parts of ethyl acetate at 45° C. over a 1-hour period. The mixture is subsequently agitated at 45° C. for a half hour. No precipitate separates when the mass is cooled to 5° C. Further addition of 27 parts (0.74 mole) of hydrogen chloride at 45° C. and subsequent cooling to −30° C. lead to the separation of only 6 parts of precipitate.

(B) 82 parts (2.24 moles) of hydrogen chloride gas is bubbled over a solution of 449 parts (2.57 moles) of the above toluenediisocyanate mixture in 1745 parts of dioxane at 45° C. over a 99-minute period. The charge is heated an additional half hour at 45° C. and subsequently cooled to 3° C. No precipitation occurs within an hour at 3° C.

(C) 207 parts (5.67 moles) of hydrogen chloride gas is introduced into 469 parts (2.69 moles) of the above toluenediisocyanate mixture in 1740 parts of diethyl ether at 20–25° C. without precipitating any carbamyl chloride.

Example 11.—Treatment of a 54.7:45.3 mixture at superatmospheric pressure (A) A Parr shaker assembly with a gas reservoir of 4 liters and a jacketed-reactor bottle are used. A solution of 33 g. of toluene-2,4-diisocyanate and 27.4 g. of toluene-2,6-diisocyanate in 100 ml. o-dichlorobenzene is placed in the bottle which is sealed in the jacketed-shaker. Water at 50° C. is pumped through the jacket. The reaction system is alternately pressured with hydrogen chloride and evacuated 3–4 times. Finally the pressure is adjusted to about 2 atmospheres (absolute) and the shaker is started. After 5 minutes the gas reservoir is shut off and the bottle is evacuated to 25 mm. pressure. At the same time ice water is started circulating through the jacket. After cooling for 30 minutes the mixture is filtered, the precipitate washed and the filtrate distilled. Analysis indicates that the isomer ratio in the filtrate is 31:69. A 46% conversion of isocyanate to carbamyl chloride is obtained during the run.

(B) The procedure of 11A is repeated except that the reaction is carried out at 25° C. A 32% conversion occurs. The ratio of the 2,4-:2,6-isomers in the filtrate is 35:65.

A preferred embodiment of the present invention is directed to the process of removing toluene-2,4-diisocyanate and toluene-2,6-diisocyanate in a molar ratio of at least 70:30 from a mixture of the isomers contained in a molar ratio from 91:9 to 40:60 which comprises treating a 15–30% solution by weight in o-dichlorobenzene at a temperature between 40–50° C. with about 1–2 molar equivalents of gaseous hydrogen chloride for each mole of toluene-2,4-diisocyanate to be removed from the mixture, then cooling the mixture to about 0–10° C., and separating the precipitated carbamyl chloride.

What is claimed is:

1. A process for removing toluene-2,4-diisocyanate and toluene-2,6-diisocyanate in a molar ratio of at least about 70:30, from an isomeric mixture thereof, said mixture containing the isomers in a molar ratio from 91:9 to 40:60, which process comprises treating a solution containing up to about 50% by weight of said mixture in an inert solvent, at a temperature between about 0 to 70° C., with at least about one molar equivalent of dry hydrogen chloride for each mole of toluene-2,4-diisocyanate to be removed from the mixture, followed by cooling the mixture and separating the precipitate thus formed.

2. The process of claim 1 wherein the toluene-2,4-diisocyanate and toluene-2,6-diisocyanate are removed in a molar ratio of at least about 80:20.

3. The process of claim 1 wherein the solution treated contains about 20% by weight of the isomeric mixture in an inert solvent.

4. The process of claim 1 wherein the inert solvent is ortho-dichlorobenzene.

5. The process of claim 1 wherein said solution is treated with dry hydrogen chloride at a temperature within the range of 40 to 50° C.

6. The process of claim 1 conducted at atmospheric pressure.

7. The process of claim 1 wherein the hydrogen chloride treated solution is cooled to a temperature within the range of 0 to 5° C.

8. A process for removing toluene-2,4-diisocyanate and toluene-2,6-diisocyanate in a molar ratio of at least about 70:30, from an isomeric mixture thereof, said mixture containing the isomers in a molar ratio of about 50:50, which process comprises treating about a 30% by weight solution of said mixture in o-dichlorobenzene, at about 0–25° C. with anhydrous gaseous hydrogen chloride until about 45% of the toluene diisocyanate initially present has been converted to the carbamyl chloride, followed by cooling the mixture, separating the precipitate thus formed, concentrating the filtrate to obtain an isomer mixture having about a 73% 2,6-isomer content which isomer mixture is subsequently treated by dissolving in ethyl acetate to make a solution approximately 35% by weight, cooling said solution to about −40° C., collecting the crystals which separate to the extent of about 25% of the content of the said isomer mixture, said crystals containing about 95% of said 2,6-isomer.

9. A process for removing toluene-2,4-diisocyanate and toluene-2,6-diisocyanate in a molar ratio of at least 70:30, from an isomeric mixture thereof, said mixture containing the isomers in a molar ratio from 91:9 to 40:60, which process comprises treating a 15–30% solution by weight thereof in ortho-dichlorobenzene, at a temperature between 40–50° C., with at least about one molar equivalent of dry gaseous hydrogen chloride for each mole of toluene-2,4-diisocyanate to be removed from the mixture, followed by cooling the mixture to a temperature within the range of about 0 to 10° C., separating the precipitated carbamyl chloride, followed by heating, under anhydrous conditions, to remove hydrogen chloride.

No references cited.